(12) United States Patent
Lindau

(10) Patent No.: US 6,392,811 B1
(45) Date of Patent: May 21, 2002

(54) ARRANGEMENT FOR A WEARABLE OPTOMECHANICAL DEFLECTOR FOR A DISPLAY UNIT

(75) Inventor: Sten Lindau, Taby (SE)

(73) Assignee: SaabTech Electronics AB, Jarfalla (SE)

(*) Notice: Subject to any disclaimer, the term of this patent is extended or adjusted under 35 U.S.C. 154(b) by 0 days.

(21) Appl. No.: 09/719,312
(22) PCT Filed: May 26, 1999
(86) PCT No.: PCT/SE99/00888
  § 371 Date: Jan. 25, 2001
  § 102(e) Date: Jan. 25, 2001
(87) PCT Pub. No.: WO99/64910
  PCT Pub. Date: Dec. 16, 1999

(30) Foreign Application Priority Data

Jun. 9, 1998 (SE) .............................................. 9802029

(51) Int. Cl.[7] .............................................. G02B 27/14
(52) U.S. Cl. ...................................... 359/631; 359/633
(58) Field of Search .............................. 359/631, 633, 359/630, 637

(56) References Cited

U.S. PATENT DOCUMENTS 5,459,612 A * 10/1995 Ingleton ..................... 359/630
5,742,421 A   4/1998 Wells et al. ................. 359/214
5,748,377 A   5/1998 Matsumoto et al. ......... 359/633
6,324,012 B1 * 11/2001 Aratani et al. .............. 359/627

FOREIGN PATENT DOCUMENTS

EP   0 518 834 A2   5/1992
GB   2 299 873 A    10/1996

* cited by examiner

Primary Examiner—Ricky Mack
(74) Attorney, Agent, or Firm—Connolly Bove Lodge & Hutz LLP

(57) ABSTRACT

An optomechanical deflector for a line display unit (3) comprises ocular and objective functions (1, 6, 6a) and also a component or components for sweep-generation (2) and image turning. Each respective sweep-generating component (2) can be positioned at a distance (B) upwards and/or to the side of one or both eye(s) (7). By means of one or more first mirror surfaces (2a), the sweep-generating component reflects incoming radiation (4) from the line display unit (3) to one or more second mirror surface(s) (5a), which form(s) part of the objective function, on a component arranged in a rotationally fixed manner. Each respective second mirror surface in turn reflects radiation (4b) towards a mirror surface (6a) or mirror surfaces forming part of the ocular function, which reproduce(s) the respective first mirror surface for the pupil(s) (7a) of the eye(s). In an alternative embodiment, the sweep-generating component and the rotationally fixed component have changed places.

20 Claims, 3 Drawing Sheets

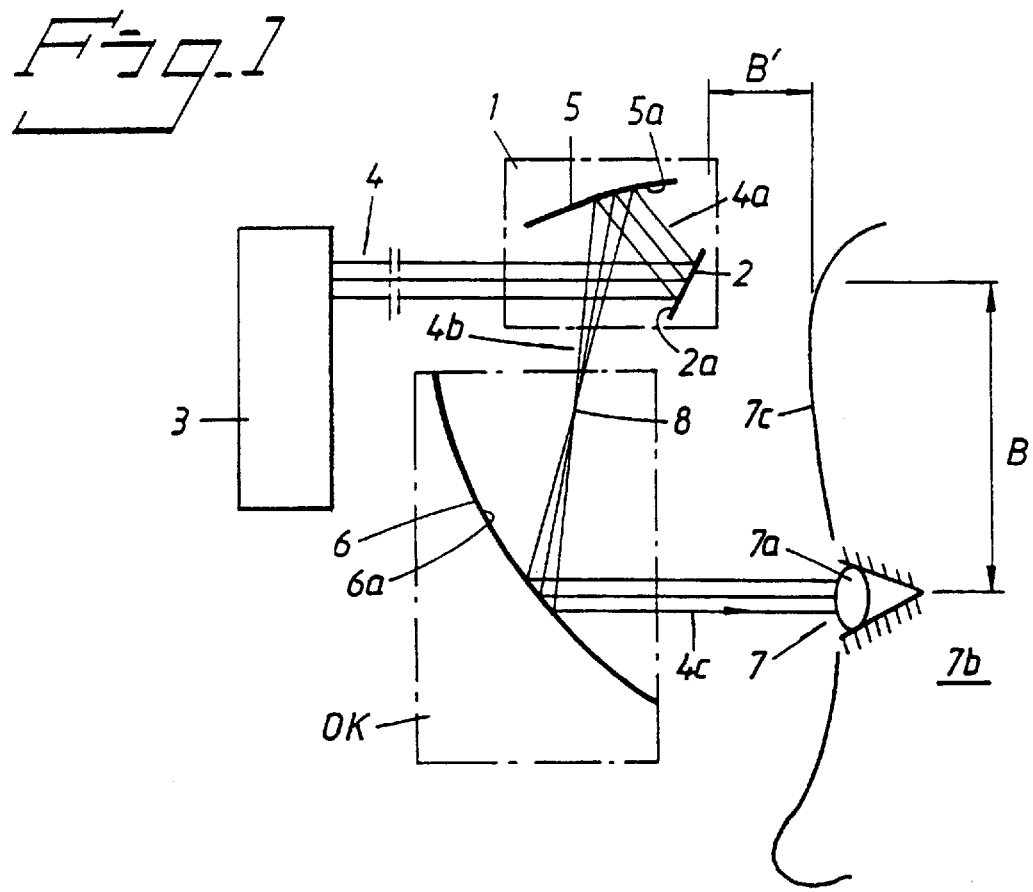
Fig.1
Fig.1a
Fig.1b
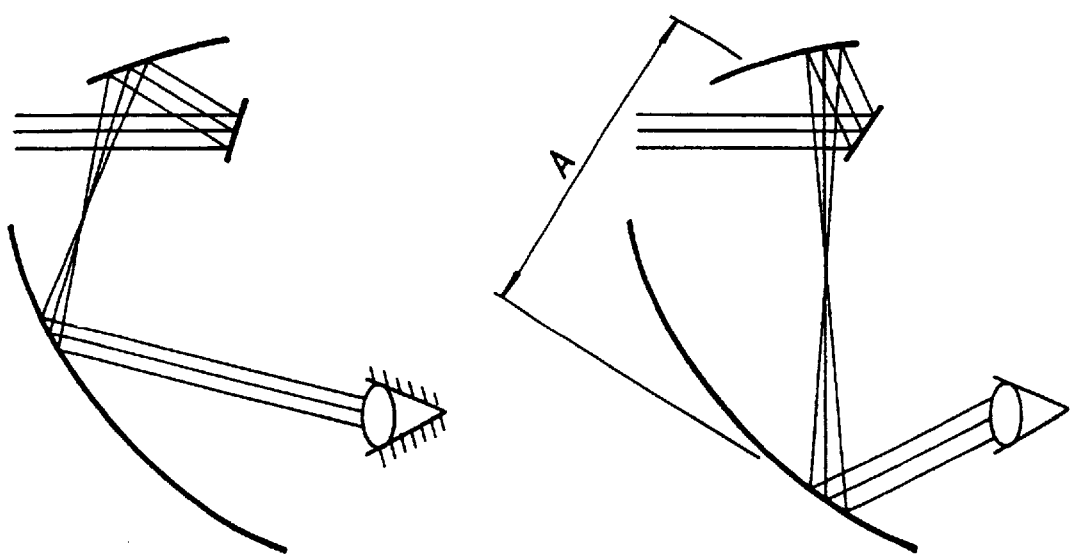

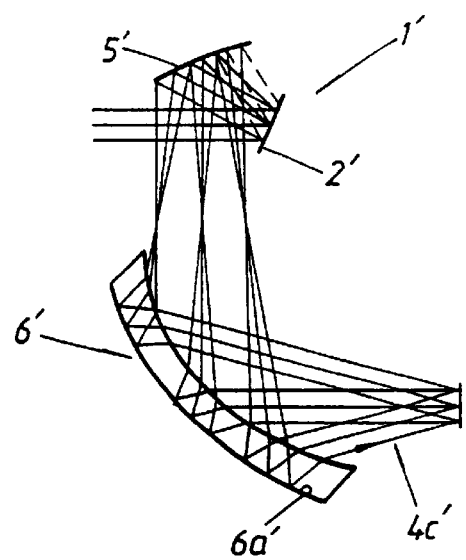
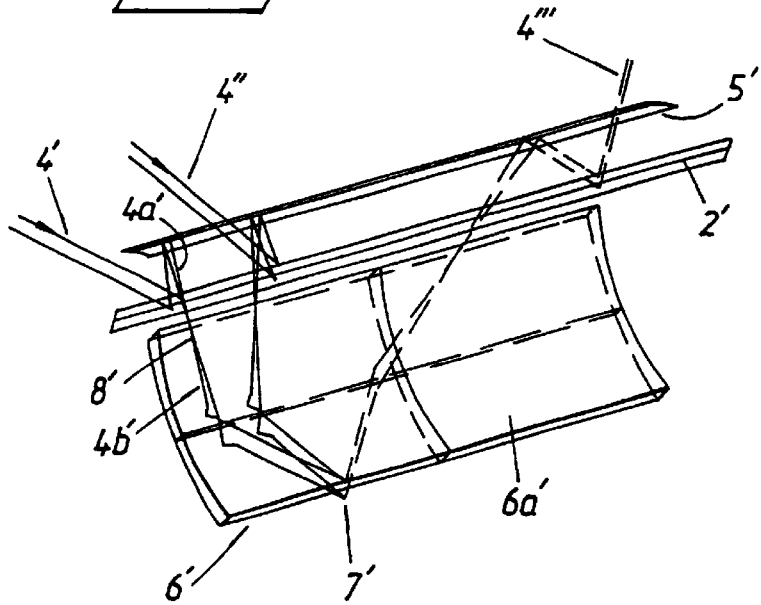
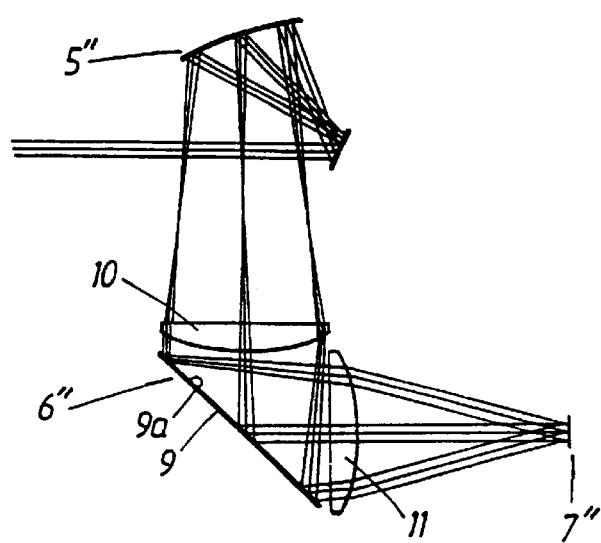

ARRANGEMENT FOR A WEARABLE OPTOMECHANICAL DEFLECTOR FOR A DISPLAY UNIT

BACKGROUND OF THE INVENTION

The present invention relates to an arrangement for an optomechanical deflector, which can be worn close to the eye(s), for a line display unit, where the deflector comprises ocular and objective functions and also a component or components for sweep generation and image turning.

It is previously known to use a deflector function in connection with a single-line or multi-line display unit where the purpose of the deflector function is to deflect radiation falling on the eye as the line-scanning function is performed on the display unit. Reference is made to European Patent Application 518834 A2, through which an arrangement with a display unit and a deflector of this type is previously known.

In the known arrangement, the sweep generation function is brought about by means of a tilting mirror which must tilt with great frequency in advanced systems. This requirement conflicts with requirements for the field of vision to be large in most cases and for the tilting mirror, for various reasons, to be positioned at a relatively great distance in front of the eye. A greater distance in front of the eye entails a need for a larger tilting mirror. The need for a relatively great distance may result from the wearer/observer having to be able to wear (conventional) glasses, from it being undesirable for safety reasons to have a rapidly tilting component very close to the eye, etc.

The components performing the four main functions (ocular, objective, image turning and sweep generation) are themselves to be capable of comprising a number of optical elements, and an optical element involved may alternatively perform more than one of said main functions. The invention is also based on the awareness that a component which is tilted with great frequency is to be small and light. Simple adjustment possibilities of the components in production are also desirable.

BRIEF SUMMARY OF THE INVENTION

The main object of the present invention is to solve inter alia the problems indicated above.

An arrangement according to the invention can be considered to be characterized mainly in that one or more first tiltably arranged components performing the sweep generation can be positioned so that they are displaced from the immediate vicinity of the eye(s) in front of the eye(s) in the upward direction, the downward direction and/or towards the side, and in that each respective first component interacts with a rigidly arranged second component for the purpose of ray guidance. Further features are that the respective first or second component(s) reflect(s), by means of an associated first mirror surface or associated first mirror surfaces, incoming radiation from the line display unit to an associated second mirror surface or associated second mirror surfaces on the second or, respectively, the first component, in that the respective first or second mirror surface is cylindrical, and in that the second mirror surface(s) in turn reflect(s) radiation towards a third mirror surface or third mirror surfaces forming part of the ocular function, which reproduce(s) the respective first mirror surface for the pupil of the respective eye.

In an embodiment of the invention, each respective sweep-generating component consists of a tilting mirror of small dimensions or small mass and, in spite of this, a field of vision is established for the eye or eyes, which is relatively large by virtue of the fact that the tilting mirror is optically reproduced in the pupil of the respective eye. Furthermore, the sweep-generating component(s) or the tilting mirror(s) can be positioned in the space situated in front of the forehead of the wearer or the observer. The second mirror surface(s) then angle(s) the incoming light ray from the line display unit in towards the eye or eyes. The reproducing optics are of cylindrical shape with the cylinder axis parallel to the line display. It is also proposed that the objective function be arranged at a distance from the ocular function, which results in the optical system obtained being afocal. In a preferred embodiment, the ocular function comprises a concavo-convex cylindrical lens which is mirror-coated on the convex side, on which said third mirror surface or mirror surfaces is or are arranged. The sweep-generating component or tilting mirror can also function as an image turner or form part of the image turning function in a manner known per se. In an alternative embodiment, the ocular function can comprise one or more cylindrical lenses and a plane mirror or plane mirrors arranged close to the latter. In a further alternative embodiment, the objective function comprises one or more cylindrical lenses at the same time as the second cylindrical mirror surface(s) is (are) in the form of a field lens or concave mirror. It is also possible to have a partly transparent mirror form part of the ocular function in order to make it possible for the wearer to observe the surroundings together with the image generated in or on the retina(s) of the eye(s) by the line display unit.

By means of the above proposals, a large field of vision can be preserved in spite of the small size of the sweep-generating component which can moreover be positioned at a safe distance to the side of and/or above the eye or eyes. The observer can wear glasses. Said function can be achieved using elements known per se and the observer can observe not only the image produced by the line display unit but also, if desired, the surroundings. The new arrangement is also based on the awareness that the reproducing optics can advantageously be made cylindrical and with a small and light tilting component.

A number of proposed embodiments of an arrangement which has the significant characteristics of the invention are described below with simultaneous reference to the appended drawings, in which

BRIEF DESCRIPTION OF THE DRAWINGS

FIGS. 1–1b show in principle from the side an arrangement with a tilting plane mirror, a cylindrical mirror and a mirror forming part of an ocular function, where the tilting mirror is in one end position, the central position and, respectively, the other end position, FIG. 2 shows in principle and from the side the ray path at the tilting mirror, the cylindrical mirror, and also the mirror forming part of the ocular function, FIG. 2a shows in perspective the components and the ray path according to FIG. 2, FIG. 3 shows from the side an alternative embodiment of the objective function and ocular function.

DETAILED DESCRIPTION OF THE INVENTION

Figure 4:
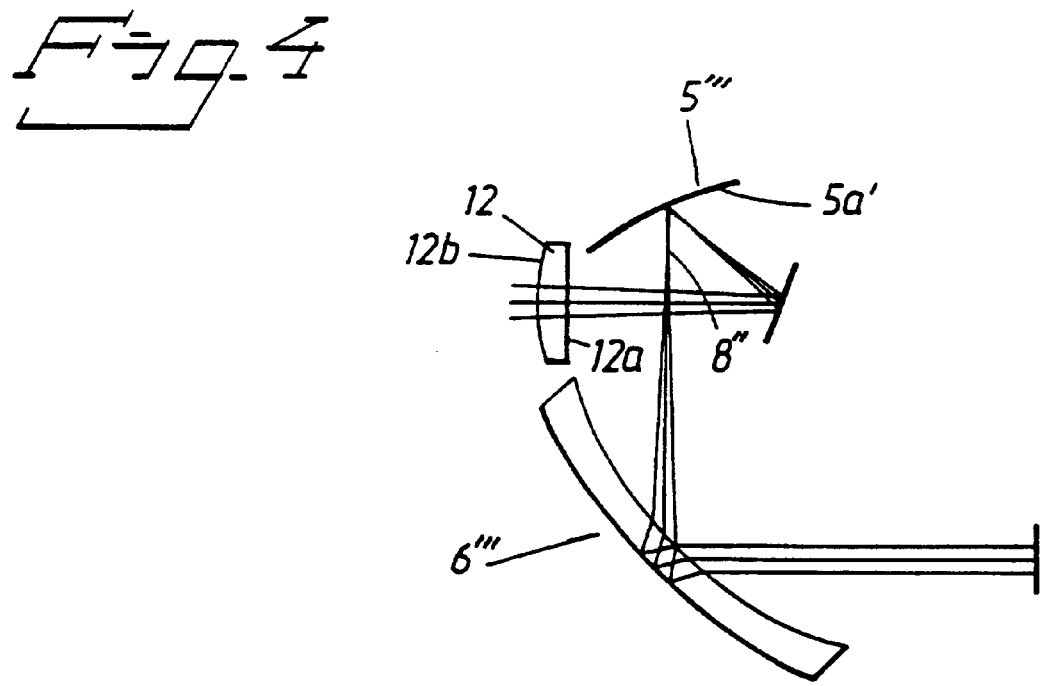
FIG. 4 shows in principle and from the side the use of an objective lens, a field lens in association with the tilting mirror, and also a mirror forming part of the ocular function.

In FIG. 1, an objective function is shown in principle by 1. In the example shown, a mirror 2 which is tiltable in a manner known per se is arranged in the objective function. The mirror 2 is provided with a mirror surface 2a which is plane in the example shown. The mirror surface 2a receives incoming radiation 4 from a line display unit 3 known per se. The tiltable mirror is in this connection, in a likewise known manner, arranged tiltably with a frequency which is related to the line deflection function of the unit 3. The function performing the tilting does itself not affect the present invention and has therefore not been included in the case illustrated. In the present embodiment, the mirror surface 2a has a length of approximately 140 mm and a width of approximately 7 mm and weighs approximately 5–15 grams.

Arranged close to said sweep-generating unit 2, 2a is a rigidly arranged mirror or lens 5 which forms part of the objective function 1 and is provided with a cylindrical mirror surf ace or reflective surface 5a which in turn reflects the radiation 4a reflected by the tilting mirror surface 2a towards a concave mirror 6 forming part of an ocular function OK. The radiation reflected by the mirror or lens 5 is indicated by 4b. The surface 6a of the concave mirror 6 in turn reflects the radiation 4b to an eye 7 (its pupil 7a) of a viewer/observer 7b, and the reflected radiation from the mirror surface 6a is indicated by 4c. The concave mirror surface reproduces the tilting mirror surface 2a in the pupil of the eye. FIGS. 1, 1a and 1b show in this connection one end position, the central position and, respectively, the other end position of the tilting mirror 2 or the mirror surface 2a.

The objective function 2, 5 is positioned at a distance A from the ocular function, which results in the optical system described being afocal. The focal point 8 of the system is located halfway between the mirrors 5a and 6a. In the case shown, the tilting mirror (component 2) performing the sweep generation function is also arranged so as to perform the image turning function so that an image turned the right way up falls on the pupil 7a of the eye. The tilting mirror/component is positioned at a distance B away from the eye 7a and at a distance B' in front of the forehead 7c of the viewer/observer. In the case shown, the distance B is of the order of 30–60 mm and the distance B' is of the order of 10–50 mm. In a preferred arrangement, the tilting mirror is arranged in front of the forehead 7c of the viewer 7b. The tilting mirror can be positioned straight or obliquely upwards, straight or obliquely downwards, or straight towards the side seen from the eye(s). By virtue of the cylindrical shape of the mirror/lens 6, the arrangement can be designed so that incoming and outgoing light is parallel.

In an alternative embodiment, the components 2 and 5 can in principle change places, the first mirror surface being arranged on the component 5 and the second mirror surface on the component 2.

In an advantageous embodiment according to FIGS. 2 and 2a, the ocular function 6' interacting with the objective function 1' consists of what is known as a Mangin mirror, that is to say a concavo-convex cylindrical lens which is mirror-coated on the convex surface (the inner surface 6a') so that reflection 4c' takes place. In FIGS. 2 and 2a, the corresponding components/surfaces described in FIGS. 1–1b have been given the same reference numbers with primes added. The ray paths 4',4" and 4"' correspond to the ray paths according to FIGS. 1, 1a and, respectively, 1b. The elongate, cylindrical nature of the components 5' and 6' can be seen from FIGS. 2 and 2a (compare FIGS. 1, 1a and 1b).

The eye 7' represents a left eye and corresponding ray paths can be obtained for a right eye, that is to say the embodiment according to FIG. 2a is intended for both eyes. This embodiment simplifies adjustment requirements in production as mirror surfaces for both eyes are used and, as a result, a large number of individual components do not have to be fitted together.

The advantage of using the Mangin mirror is that very good visual acuity is obtained over the entire field of vision.

In the embodiment according to FIG. 3, the ocular function 6" comprises a plane mirror 9 with a mirror surface 9a and lenses 10 and 11 arranged close to the latter. In other respects, the arrangement shown in FIG. 3 functions as above and the ray paths for the central position and the outer positions in the sweep generation function are also shown in this case.

In the embodiment according to FIG. 4, the objective function includes on the one hand an objective lens 12 and on the other hand a field lens or concave mirror 5'", the concave mirror surface of which is indicated by 5a'. Here, the objective function is represented essentially by the lens 12. Although it may in itself be questioned, the field lens is also considered to be included here. The ocular function comprises a Mangin mirror 6'" in this embodiment also. The objective lens 12 is cylindrical and the cylindrical mirror 5'" is positioned close to the focus and functions as a field lens. The plane surface 12a of the objective lens faces towards the sweep-generating component and the convex surface 12b faces towards the line scanning unit. The advantage of this embodiment is that the objective lens and the ocular mirror can have a relatively long focal length by virtue of their being positioned a long way from one another, which results in good (improved) visual acuity.

Figure 5:
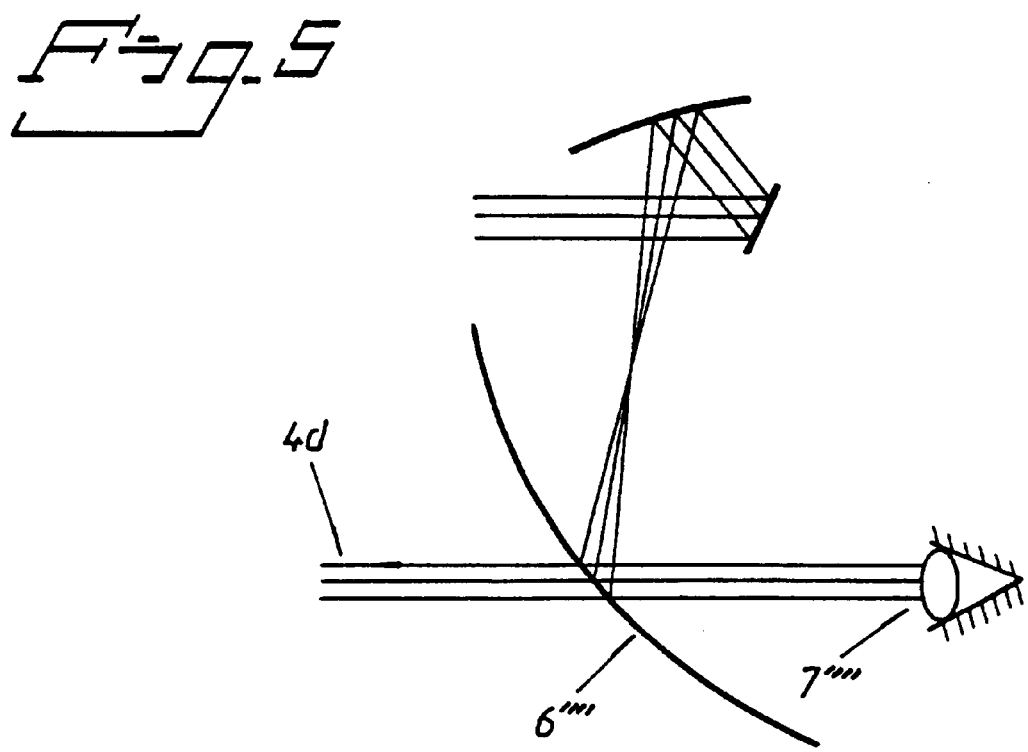
FIG. 5 shows in principle and from the side an embodiment differing from the embodiment according to FIG. 4, where the mirror of the ocular function consists of a partly transparent or semi-transparent transparent mirror.

In the embodiment according to FIG. 5, the mirror 6" and 6'" of the ocular function according to the embodiments in FIGS. 3 and 4 has been replaced by a partly transparent, for example semi-transparent, ocular mirror 6"" which makes it possible for the viewer 7b (not shown specifically in FIG. 5) to view the surroundings at the same time as s/he looks at the line display image (line display unit). This function is relevant in many applications of the line display unit as such.

The invention is not limited to the examples above but may be modified within the scope of the following patent claims and the idea of the invention.

What is claimed is:

1. Arrangement for an optomechanical deflector, which can be worn close to the eye(s) (7), for a line display unit (3), where the deflector comprises objective and ocular functions and also sweep generation and preferably image-turning function(s), characterized in that one or more first tiltably arranged components (2 or, respectively, 5) performing the sweep generation can be positioned so that they are displaced from the eye(s) upwards, downwards and/or towards the side, in that each respective first component interacts with a rigidly arranged second component (5 or, respectively, 2) for the purpose of ray guidance, in that the respective first or second component(s) reflect(s), by means of an associated first mirror surface or associated first mirror surfaces, incoming radiation from the line display unit to an associated second mirror surface or associated second mirror surfaces on the second or, respectively, the first component, in addition to which the respective first or second mirror surface is cylindrical, and in that each respective second mirror surface in turn reflects radiation (4b) towards a third mirror surface or third mirror surfaces forming part of the ocular function, which reproduce(s) the respective first mirror surface (2a) for the pupil(s) (7a) of the eye(s).

2. Arrangement according to Patent claim 1, characterized in that each respective sweep-generating component (2) consists of a tilting mirror of small dimensions or small mass, and in that a field of vision or fields of vision established for the eye(s) is or are, in spite of this, relatively large by virtue of the fact that the tilting mirror is optically reproduced in or close to the pupil (7a) of the respective eye.

3. Arrangement according to Patent claim 1, characterized in that the sweep-generating component(s) (2) or the tilting mirror(s) can be positioned in the space in front of the forehead (7c) of a wearer/observer, and in that the second mirror surface(s) (5a) then angle(s) the incoming light radiation from the line display unit in towards the eye(s).

4. Arrangement according to Patent claim 1, characterized in that the reproducing optics are essentially cylindrical and as a result work with incoming and outgoing parallel light, that is to say the optical system obtained is afocal.

5. Arrangement according to claim 1, characterized in that the ocular function comprises a concavo-convex cylindrical lens (6') which is mirror-coated (6a') on the convex side, on which said third mirror surface(s) is (are) thus arranged.

6. Arrangement according to claim 1, characterized in that the sweep-generating component (2) or tilting mirror also functions as an image turner or forms part of the image turning function.

7. Arrangement according to claim 1, characterized in that the ocular function comprises one or more plane third mirror surfaces (9a) and cylindrical lenses (10, 11) arranged close to the latter.

8. Arrangement according to claim 1, characterized in that the objective function comprises one or more objective lenses (12), and in that each respective second cylindrical mirror surface (5a') is arranged as a field lens (5''') or concave mirror.

9. Arrangement according to claim 1, characterized in that the ocular function comprises a partly transparent mirror (6''') in order to make it possible for the wearer/observer to observe the surroundings together with the image(s) generated in or on the retina(s) of the eye(s) by the line display unit (3).

10. Arrangement according to claim 2, wherein the sweep-generating component(s) or the tilting mirror(s) can be positioned in the space in front of the forehead of a wearer/observer, and wherein the second mirror surface(s) then angle(s) the incoming light radiation from the line display unit in towards the eye(s).

11. Arrangement according to claim 2, wherein the reproducing optics are essentially cylindrical and as a result work with incoming and outgoing parallel light, that is to say the optical system obtained is afocal.

12. Arrangement according to claim 3, wherein the reproducing optics are essentially cylindrical and as a result work with incoming and outgoing parallel light, that is to say the optical system obtained is afocal.

13. Arrangement according to claim 2, wherein the ocular function comprises a concavo-convex cylindrical lens which is mirror-coated on the convex side, on which sasid third mirror surface(s) is (are) thus arranged.

14. Arrangement according to claim 3, wherein the ocular function comprises a concavo-convex cylindrical lens which is mirror-coated on the convex side, on which sasid third mirror surface(s) is (are) thus arranged.

15. Arrangement according to claim 4, wherein the ocular function comprises a concavo-convex cylindrical lens which is mirror-coated on the convex side, on which sasid third mirror surface(s) is (are) thus arranged.

16. Arrangement according to claim 2, wherein the sweep-generating component or tilting mirror also functions as an image turner or forms part of the image turning function.

17. Arrangement according to claim 3, wherein the sweep-generating component or tilting mirror also functions as an image turner or forms part of the image turning function.

18. Arrangement according to claim 4, wherein the sweep-generating component or tilting mirror also functions as an image turner or forms part of the image turning function.

19. Arrangement according to claim 5, wherein the sweep-generating component or tilting mirror also functions as an image turner or forms part of the image turning function.

20. Arrangement according to claim 2, wherein the ocular function comprises one or more plane third mirror surfaces and cylindrical lenses arranged close to the latter.

* * * * *